(12) United States Patent  (10) Patent No.: US 12,188,349 B1
Al Arji et al.  (45) Date of Patent: Jan. 7, 2025

(54) SYSTEM AND METHOD FOR INTEGRATED LEAK DETECTION AND ISOLATION

(71) Applicant: SAUDI ARABIAN OIL COMPANY, Dhahran (SA)

(72) Inventors: Faisal M. Al Arji, Dhahran (SA); Sami Naitah, Al-Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/447,096

(22) Filed: Aug. 9, 2023

(51) Int. Cl.
 *E21B 47/107* (2012.01)
 *G01M 3/24* (2006.01)

(52) U.S. Cl.
 CPC .............. *E21B 47/107* (2020.05); *G01M 3/24* (2013.01); *E21B 2200/22* (2020.05)

(58) Field of Classification Search
 CPC ........ E21B 47/107; E21B 47/10; E21B 47/00; E21B 47/117; E21B 2200/22; G01M 3/2853
 See application file for complete search history.

(56) References Cited

U.S. PATENT DOCUMENTS

| 10,900,349 | B2 * | 1/2021 | Seshadri | G01V 1/40 |
| 2018/0010443 | A1 * | 1/2018 | Lu | E21B 49/08 |
| 2022/0179117 | A1 * | 6/2022 | Fouda | E21B 47/0025 |
| 2023/0383649 | A1 * | 11/2023 | Valero | G01V 1/116 |

OTHER PUBLICATIONS

Michel, C.M., "Methods of Detecting and Locating Tubing and Packer Leaks in the Western Operating Area of the Prudhoe Bay Field"; SPE Production & Facilities; vol. 10, Issue 02, Paper No. SPE-21727-PA; pp. 124-128; May 1995 (5 pages).

Julian, J.Y. et al., "Detecting Ultra-small Leaks With Ultrasonic Leak Detection-Case Histories From the North Slope, Alaska"; Proceedings of the International Oil Conference and Exhibition in Mexico; Paper No. SPE-108906-MS; pp. 1-10; Jun. 27, 2007 (10 pages).

* cited by examiner

*Primary Examiner* — Tara Schimpf
*Assistant Examiner* — Ursula Lee Norris
(74) *Attorney, Agent, or Firm* — Osha Bergman Watanabe & Burton LLP

(57) ABSTRACT

Described is a system for identifying leaks in a wellbore. The system includes a bottom hole assembly having an acoustic logging tool, coiled tubing, and one or more inflatable packers. The system further includes a computing device with an artificial intelligence analyzer having edge computing capabilities. When the bottom hole assembly is run into the wellbore, the acoustic logging tool is configured to identify a leak interval using acoustic waves. Data associated with the leak interval is transmitted to the computing device to be analyzed using the edge computing capabilities. A leak is identified within the leak interval upon analysis of the data. In response to identifying the leak, the one or more inflatable packers are deployed to seal the leak in the leak interval.

17 Claims, 4 Drawing Sheets

SYSTEM AND METHOD FOR INTEGRATED LEAK DETECTION AND ISOLATION

BACKGROUND

Fluid flow in a well environment creates a rich spectrum of acoustic energy that penetrates the surroundings. Acoustic waves may be encoded with information about the type and location of fluid flow in the well environment. However, since sound frequency and intensity may vary in well environments, noisy interference may drown out important signals. Further, translation of acoustic waves to fluid flow information is complex.

Existing methods measure the acoustic contribution of fluid flow from an entire zone of a wellbore. Therefore, identifying a specific section of a zone contributing to undesired flow is difficult. Additionally, the interpretation of data obtained from the entire zone may be inaccurate due to suspected cross flow in the wellbore or behind casing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for leak detection and isolation. The method includes positioning a bottom hole assembly within a wellbore, the bottom hole assembly having an acoustic logging tool, coiled tubing, and one or more inflatable packers. Acoustic signal data from within the wellbore is detected using the acoustic logging tool. While running in hole, the acoustic signal data is transmitted and analyzed in real time using edge computing. Based on the analyzed acoustic signal data, a leak interval is identified within the wellbore. A leak in the leak interval is isolated using the bottom hole assembly.

In another aspect, following identification of the leak interval, a fluid is pumped through the coiled tubing of the bottom hole assembly to inflate the one or more packers to isolate the leak interval.

In another aspect, the leak interval is identified based on acoustic waves.

In another aspect, isolating the leak includes deploying the one or more inflatable packers in the bottom hole assembly to seal a target zone corresponding to the leak interval.

In another aspect, data identifying the leak interval is transmitted to a surface of the wellbore in real time, and the data identifying the leak interval is analyzed using artificial intelligence methods.

In another aspect, the artificial intelligence methods include edge computing.

In another aspect, temperature values are obtained from one or more temperature sensors withing the wellbore, and a temperature profile is generated.

In another aspect, the leak interval is identified based on a correlation between the analyzed acoustic signal data and the temperature profile of the wellbore.

In another aspect, following isolation of the leak, an impact on oil production from the wellbore is predicted using artificial intelligence methods.

In one aspect, embodiments disclosed herein relate to a system for identifying leaks in a wellbore. The system includes a bottom hole assembly having an acoustic logging tool, coiled tubing, one or more inflatable packers, and a computing device having an artificial intelligence analyzer with edge computing capabilities. When the bottom hole assembly is run into the wellbore, the acoustic logging tool is configured to identify a leak interval using acoustic waves. Data associated with the leak interval is transmitted to the computing device to be analyzed using the edge computing capabilities. A leak is identified within the leak interval upon analysis of the data. In response to identifying the leak, the one or more inflatable packers are deployed to seal the leak in the leak interval.

In another aspect, the acoustic logging tool comprises one or more acoustic sensors configured to generate the acoustic signal data.

In another aspect, the one or more acoustic sensors is at least one of a thickness-shear mode resonator, a surface acoustic wave sensor, a shear-horizontal acoustic plate mode sensor, a flexural plate wave sensor, and a microphone.

In another aspect, the system comprises one or more temperature sensors within the wellbore configured to obtain temperature values used to generate a temperature profile of the wellbore, and the leak interval is identified based on a correlation between the acoustic signal data and the temperature profile of the wellbore.

In another aspect, the acoustic logging tool is configured to generate an acoustic log of data related to acoustic signal data with respect to well depth.

In another aspect, the computing device is configured for transmitting data identifying the leak interval to a surface of the wellbore in real time.

In another aspect, the artificial intelligence analyzer is one of an artificial neural network, a support vector machine, a decision tree, a regression tree, a random forest, and an extreme learning machine.

In another aspect, the computing device is configured to predict an impact on oil production from the wellbore following isolation of the leak using a machine learning algorithm.

Other aspects and advantages of the claimed subject matter will be apparent from the following description and the appended claims.

BRIEF DESCRIPTION OF DRAWINGS

Specific embodiments disclosed herein will now be described in detail with reference to the accompanying figures. Like elements in the various figures are denoted by like reference numerals for consistency. Like elements may not be labeled in all figures for the sake of simplicity.

DETAILED DESCRIPTION

Figure 1:
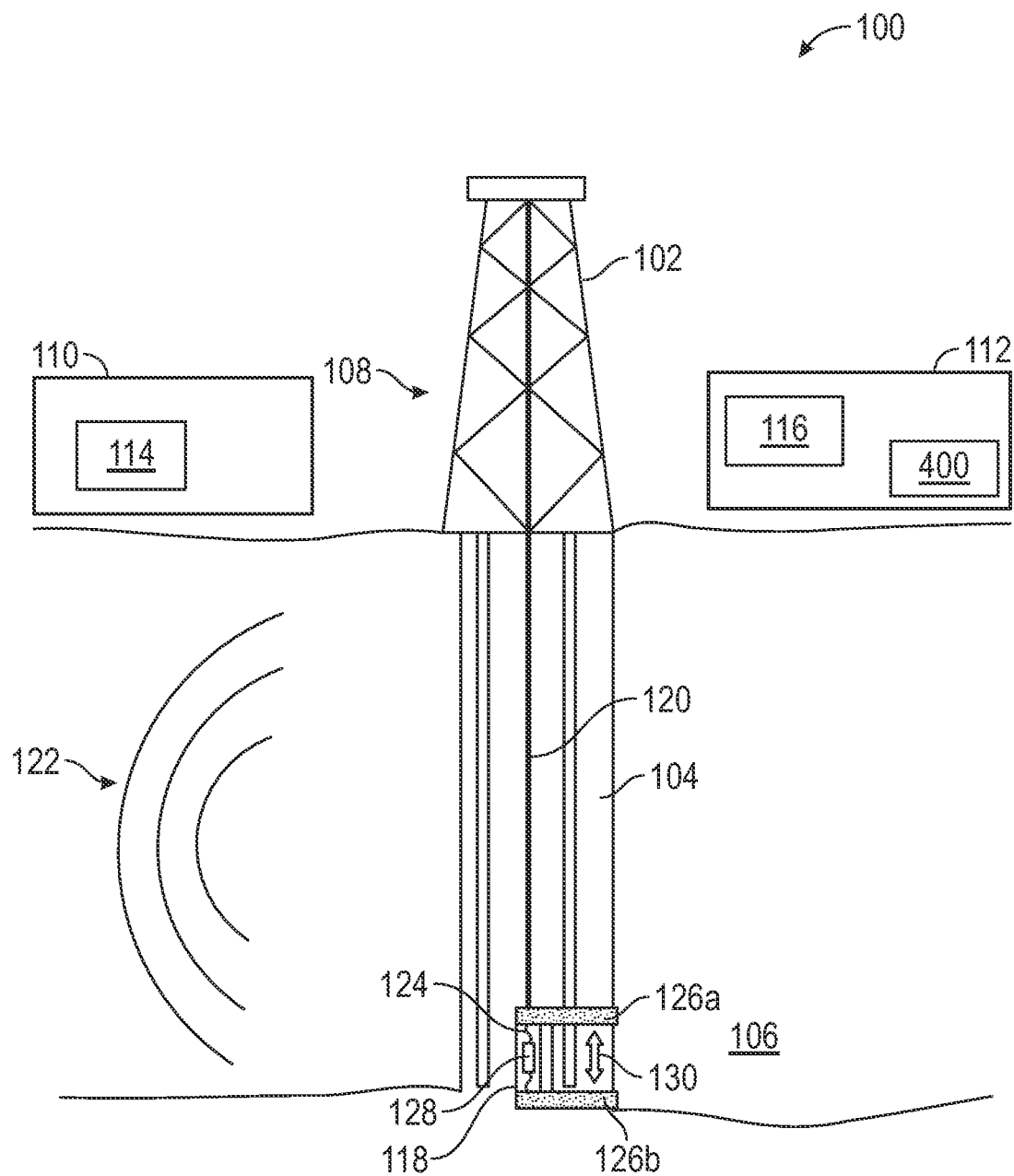
FIG. 1 illustrates a well environment according to one or more embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a passive soil gas sample system" includes reference to one or more of such systems.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

Embodiments disclosed herein include methods and systems for detecting and isolating fluid leaks in a well environment based on acoustic waves caused by fluid flow, such as a leak. A common type of leak in oil and gas wells is a casing leak. A casing leak may be caused by leaking casing threads, burst casing, corrosion, or wear due to drilling operations. A casing leak may lead to prolonged casing pressure and leaks into the formation. Leaks may also occur in any of the downhole casing strings (e.g., conductor casing, surface casing, intermediate casing, production casing), such as in the connection between two threaded tubulars or in a section of the wall of a tubular in the casing string where the wall has thinned out or failed due to years of production and harsh downhole environments. Leaks may also occur in the production string in a similar manner to the casing string. Therefore, being able to identify a leak interval (i.e., leakage pathway having a beginning and an end) in the casing, or other components of the wellbore, is important.

FIG. 1 illustrates an exemplary well environment 100 that may include a well 102 having a wellbore 104 extending into a formation 106. The wellbore 104 may include a bored hole that extends from the surface into a target zone of the formation 106, such as a reservoir. The well environment 100 may include a drilling system 108, a logging system 110, and a control system 112. The drilling system 108 may include a drill string, drill bit, a mud circulation system and/or the like for use in boring the wellbore 104 into the formation 106.

The control system 112 may include hardware and/or software for managing drilling operations and/or maintenance operations. For example, the control system may include one or more programmable logic controllers (PLCs) that include hardware and/or software with functionality to control one or more processes performed by the drilling system 108. Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. In some embodiments, the control system 112 includes a computing system that is the same as or similar to that of computer 402 described below in FIG. 4 and the accompanying description.

The control system 112 may include functionality to present raw and/or processed data, such as acoustic sensor data, temperature sensor data, flow sensor data, or pressure sensor data, among others. For example, presenting data or alarm states may be accomplished through various presenting methods. Specifically, data or alarm states may be presented through a user interface provided by a computing device. The user interface may include a graphic user interface (GUI) that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a system model. For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data or alarm states may also be presented through various audio methods. In particular, data may be rendered into an audio format and presented as sound through one or more speakers operably connected to a computing device. Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The logging system 110 may include one or more logging tools 114 for use in generating well logs of the formation. For example, a logging tool 114 may be lowered into the wellbore 104 to acquire measurements as the tool traverses a depth interval (e.g., a targeted reservoir section) of the wellbore 104. The plot of the logging measurements versus depth may be referred to as a "log" or "well log". Well logs may provide depth measurements of the well 102 that describe such reservoir characteristics as acoustic signals, formation porosity, formation permeability, resistivity, density, water saturation, and the like. Well logs are correlated with depth based on available well completion reports and well schematics. Thus, if acoustic signal data is observed, an identification may be made regarding from which section of the well completion the acoustic signal data was generated. Additionally, if acoustic signal data is obtained at a known perforation interval, a determination may be made regarding whether the acoustic signal data is from an upper part of the perforation or a lower part of the perforation. The resulting logging measurements may be stored and/or processed, for example, by the control system 112, to generate corresponding well logs for the well 102.

In some embodiments, during operation of the well 102, the control system 112 collects and records well data 116 for the well 102. The well data 116 may include, for example, a record of measurements, such as acoustic signals, received by one or more sensors, such as acoustic sensors, positioned in the wellbore 104. In some embodiments, the measurements are recorded in real-time, and are available for review or use within seconds, minutes or hours of the condition being sensed. In such an embodiment, the well data 116 may be referred to as "real-time" well data 116. Real-time well data 116 may enable an operator of the well 102 to assess a relatively current state of the well 102 and make real-time decisions regarding addressing the current state of the well 102.

In one or more embodiments, the drilling system 108 comprises a bottom hole assembly 118 (BHA) at the lowest portion of the drillstring 120. In addition to providing the necessary force and control for drilling, the BHA 118 may include measuring equipment, such as measurement-while-drilling tools and logging-while-drilling tools. For instance, the BHA 118 may include the drill bit, drill collar, stabilizer, etc. In one or more embodiments, the BHA 118 includes a set of equipment for detecting acoustic data signal 122 in the form of acoustic waves in the wellbore 104. The set of equipment may include coiled tubing 124, one or more inflatable packers 126a and 126b (or patches), and an acoustic logging tool 128. The coiled tubing 124 is a continuous length of flexible steel pipe. Generally, the coiled tubing 124 is spooled off a reel and directed downhole to a desired position in the wellbore 104. The one or more packers 126a and 126b, when inflated, serve as a plug that may be used to isolate sections in the wellbore 104, as shown in FIG. 1. As understood by one skilled in the art, packers 126a and 126b may be filled with either downhole fluids or hydraulic stores located in the BHA 118. Furthermore, the inflatable packers 126a and 126b may be compressed to expand horizontally. In addition, the BHA 118 may include one or more acoustic transducers and receivers. The acoustic transducers may be comprised of piezoelectric ceramic materials. The acoustic logging tool 128, or sonic tool, may be configured to generate acoustic logs, which may include a display of data related to the acoustic waves with respect to well depth and/or acoustic velocity.

In one or more embodiments, the acoustic logging tool 128 emits frequent sound pulses, such as every second. The pulse may be detected at one or more receivers. The difference in time elapsed between the arrival of sound at the receivers is the travel time. The acoustic logging tool 128 may measure the travel time of sound through the rock formation. In one or more embodiments, the acoustic logging tool 128 includes monopole or dipole sources located on a downhole tool run on the coiled tubing, or on wireline. Receivers located on the tool receive reflected signals. The coiled tubing or wireline is electrically connected to a computer at the surface that will be programmed to convert the received signals into visuals or descriptions representing what is occurring downhole. In one or more embodiments, the logging tool is a pulse neutron logging tool which may be utilized to detect fluid (e.g., water) movement and water-oil contact to decide which perforation intervals to isolate.

Figure 2:
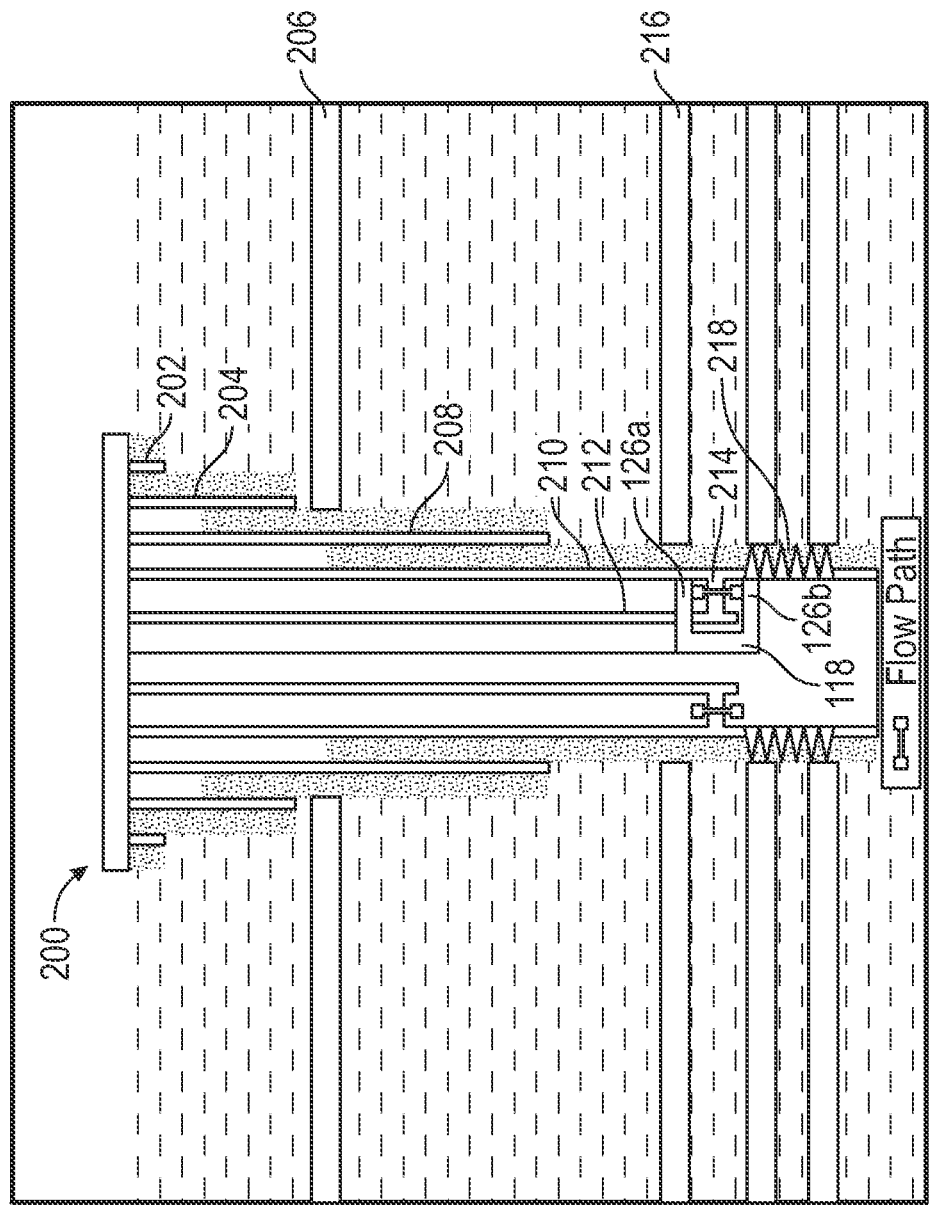
FIG. 2 illustrates a bottom hole assembly according to one or more embodiments of the present disclosure.

FIG. 2 illustrates a wellbore 200 with the BHA 118 set downhole. FIG. 2 also depicts a conductor casing string 202, surface casing string 204, water table 206, intermediate casing string 208, production casing string 210, production string 212, a production packer 214, formation 216, and perforations 218. The perforations 218 allow production fluids to flow from the formation 216 into the production casing string 210 to be produced through the production string 212. A production packer is a device that plugs or blocks a portion of the wellbore 104 during drilling or production operations. The inflatable packers 126a and 126b have a smaller inside initial diameter along with a means of expanding radially, and thereby coupling with the casing or wellbore 104. The inflatable packers 126a and 126b may be lowered into a well with the BHA 118 with wireline, pipe, or the coiled tubing. The inflatable packers 126a and 126b may expand and push against the casing wall to block fluid in a region. The inflatable packers 126a and 126b may also expand and push against the borehole in the absence of a casing. Leaks may also occur in the inflatable packers 126a and 126b. FIG. 2 depicts a leak occurring in the production packer 214 and the inflatable packers 126a and 126b being positioned to correct (i.e., block) the leaking production packer 214.

Figure 3:
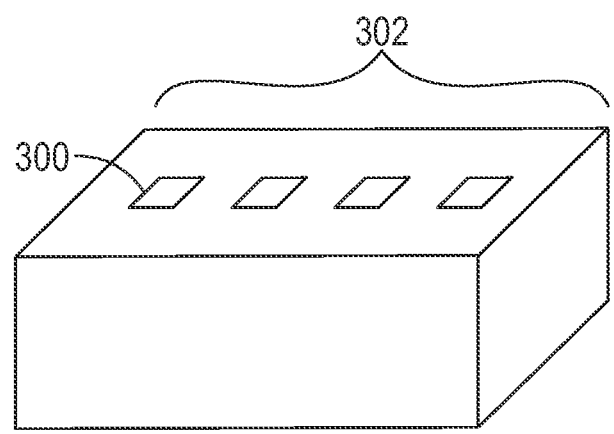
FIG. 3 illustrates an acoustic sensor array according to one or more embodiments of the present disclosure.

The acoustic logging tool 128, or sonic tool, may include acoustic sensors such as one or more acoustic emission (AE) sensors. In one or more embodiments, the AE sensors 300 together form an AE sensor array 302, as shown in FIG. 3. An AE sensor 300 of the AE sensor array 302 is configured to measure the acoustic waves, which together comprise an acoustic signal and generate an acoustic data signal. The resulting acoustic data signal is a data signal generated by the one or more AE sensors 300 that encode the detected acoustic signal. Acoustic sensing by the one or more AE sensors 300 may be performed in real-time. Based on the acoustic data signal 122, characteristics of unwanted fluid flow (represented by arrow 130), in an area of the wellbore 104 may be detected based on a correlation between the acoustic data signal 122 and one or more of temperature values in the wellbore and well depth.

After an acoustic wave is created by some process, such as fluid flow, it may be in the acoustic signal detected by the one or more AE sensors 300 and subsequently included in the acoustic data signal generated by the one or more AE sensors 300. Once such an acoustic wave has been detected and included in the acoustic signal, it is termed an "acoustic feature" of the acoustic signal. Thus, because fluid flow generates numerous acoustic waves through many processes, the acoustic signal detected by the one or more AE sensors 300 includes many acoustic features. In one or more embodiments, the AE sensor array 302 may be used to determine an origin for the acoustic features in the plurality of acoustic signals detected during, such as by triangulating an origin for each acoustic feature.

The one or more AE sensors 300 may be any sensor capable of detecting an acoustic signal and generating an acoustic data signal that reflects the acoustic signal, including a solid state acoustic sensor (for example, a thickness-shear mode resonator, a surface acoustic wave sensor; a shear-horizontal acoustic plate mode sensor, or a flexural plate wave sensor) or a microphone (for example, a condenser, fiber-optic, or piezoelectric microphone). The one or more AE sensors 300 may be positioned at any location on or near the BHA 118, including being attached to the BHA 118. For example, in the embodiment depicted in FIG. 2, one or more AE sensors are located on the BHA 118. Because acoustic waves may dissipate on a shorter length scale than some of the other energetic phenomena that are measured and/or because AEs may have a relatively low amplitude, some embodiments of the sensor array 302 may locate the one or more AE sensors 300 on or very close to the BHA 118. Those skilled in the art will appreciate that the sensor array 302 may include fewer or more sensors without departing from the scope herein. The sensor array 302 may also include one or more other sensor types, such as one or more temperature sensors.

In one or more embodiments, while running in hole, the acoustic data signal 122 from the acoustic logging tool 128 is transmitted and analyzed at the surface by a computer 402 in electronic communication with the acoustic logging tool 128. In one or more embodiments, the data may be transmitted to the surface computing device wirelessly. Any combination of mobile, desktop, server, router, switch, embedded device, or other types of hardware may be used. While running in hole and analyzing the well data 116, real-time decisions may be made in response to identify the leak and determine where to position the inflatable packers 126a and 126b. The well data 116 may include a temperature profile of the well obtained from a temperature sensor of the BHA 118. An indication of flow may be detected in a section/area of the well where a high acoustic wave value correlates with an elevated temperature value in the log. If real-time data is not needed, data may be stored in a memory and analyzed once the BHA 118 is pulled to the surface.

Figure 4:
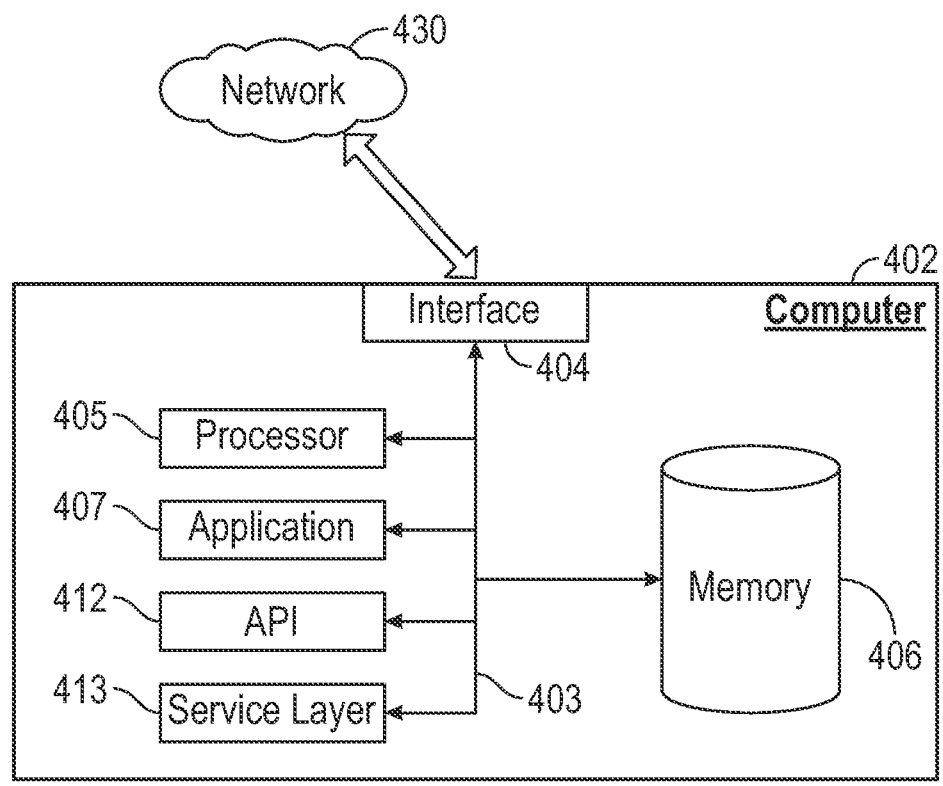
FIG. 4 illustrates a computing system according to one or more embodiments of the present disclosure.

FIG. 4 further depicts a block diagram of a computer 402 used to provide computational functionalities associated with described algorithms, methods, functions, processes, flows, and procedures as described in this disclosure, according to one or more embodiments. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may include an input device, such as a keypad, keyboard, touch screen, or other device that can accept user information, and an output device that conveys information associated with the operation of the computer 402, including digital data, visual, or audio information (or a combination of information), or a GUI.

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or another suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430. Generally, the interface 404 includes logic encoded in software or hardware (or a combination of software and hardware) and operable to communicate with the network 430. More specifically, the interface 404 may include software supporting one or more communication protocols associated with communications such that the network 430 or interface's hardware is operable to communicate physical signals within and outside of the illustrated computer 402.

The computer 402 includes at least one computer processor 405. Although illustrated as a single computer processor 405 in FIG. 4, two or more processors may be used according to particular needs, desires, or particular implementations of the computer 402. Generally, the computer processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430. For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, wherein each computer 402 communicates over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

The computer 402, or computing device, is configured for receiving the acoustic data signal 122 and translating it into data that may be utilized to detect and analyze fluid flow. In one or more embodiments, the computer 402 is an edge computing system, which allows for real-time processing of the acoustic data signal 122. The acoustic data signal 122 may be processed in real-time to aid in evaluating and addressing a suspected leak and/or a specific targeted zone. Furthermore, crossflow from undesired zones or flow behind casing may be detected. By analyzing the acoustic data signal 122 in real-time, decisions regarding how to address a leak, or other undesired flow, may be made and an action may be implemented. For instance, once a location of a leak interval is identified, the BHA 118 may be positioned proximate the leak in the wellbore 104. Fluids may then be pumped through the coiled tubing 124 into the one or more packers 126a and 126 to inflate the one or more packers 126a and 126b, in order to isolate, or block, the area of the leak, or unwanted flow path. If inflating packers is not feasible, obtained data may result in a decision to recomplete the well with new packers. Rather than needing to pull the BHA tool out of the hole to acquire and analyze the data and make a decision regarding isolation and rigging down/up the equipment, data is analyzed while the BHA is downhole to acquire real-time data and make immediate decisions.

Figure 5:
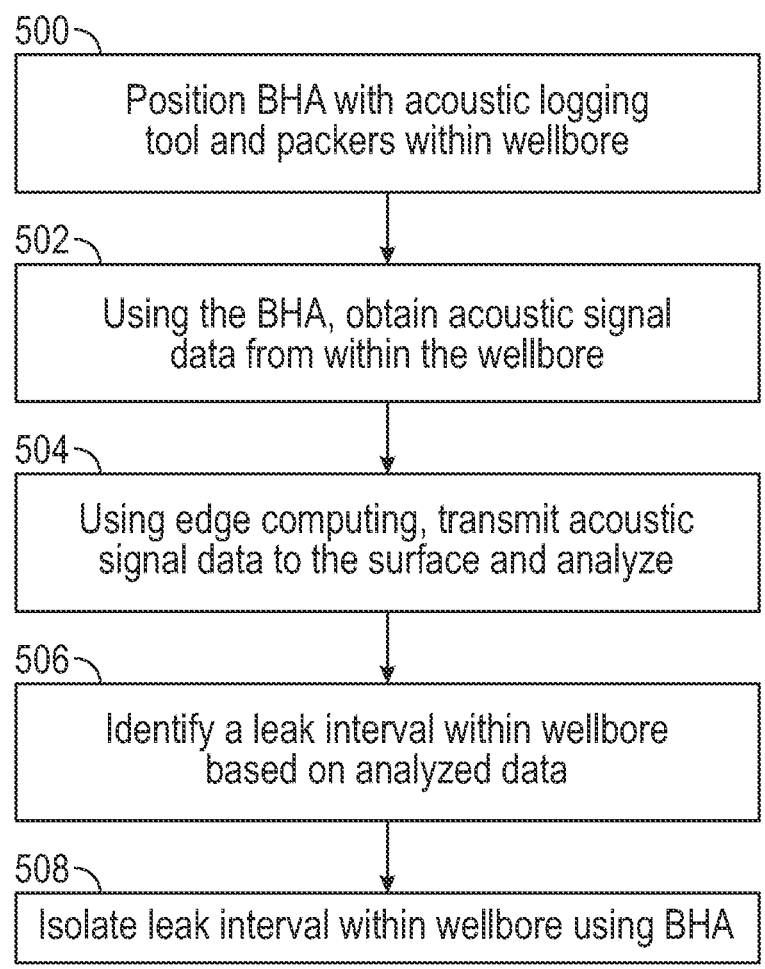
FIG. 5 illustrates a flowchart of a method for detecting and isolating fluid leaks according to one or more embodiments of the present disclosure.

FIG. 5 is a flow diagram illustrating the method for detecting and isolating leak intervals according to one or more embodiments of the present disclosure. In block 500, the BHA having the acoustic logging tool and one or more packers is positioned within a wellbore. The acoustic logging tool obtains acoustic signal data (acoustic or sound waves) from within the wellbore in block 502. In block 504, while running in hole, the acoustic signal data is transmitted to the surface of the well and analyzed in real time. In one or more embodiments, edge computing is used to analyze the acoustic waves. Edge computing is a type of distributed computing where computation and data storage occur near the sources of data. Edge computing is implemented between Internet of Things (IoT) devices, which includes hardware, such as sensors (e.g., acoustic sensors), actuators, or machines, that are programmed to perform specific function and can transmit data over the internet or other networks. In one or more embodiments, acoustic signal data is input into a computing model, computing engine, and/or artificial intelligence (AI) analyzer having edge computing capabilities in real time. Edge computing, computation, and data storage may occur at a location proximate the location of the acoustic signal data source. In block 506, a leak interval is identified based on the analyzed data. Any suitable AI analysis technique, known to those of ordinary skill in the art may be implemented to predict the oil production impact after isolation (smaller inner diameter (ID)) of the leak, predict any possible future leaks (i.e., weak points), and generate a recommendation of an effective isolation methodology. For example, a machine learning engine, machine learning model, or AI analyzer may be employed to predict the oil production after isolation of the leak and predict future leaks. The machine learning engine, model, or AI analyzer may comprise one or more of an artificial neural network (ANN), a support vector machine, a decision tree, a regression tree (RT), a random forest, an extreme learning machine (ELM), Type I and Type II Fuzzy Logic (T1FL/T2FL), a multivariate linear regression, etc. The machine learning engine may be tuned to match the complexity or otherwise of training data to ensure optimal model performance using adjustable learning parameters, referred to as tuning parameters. The same calibration subset may be used repeatedly while searching for the optimal parameters.

In block 508, the leak interval is isolated using the BHA. For instance, in one or more embodiments, pumping through coiled tubing may be applied to inflate the packers and isolate (or seal) the leak interval sections.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method for leak detection and isolation, comprising:
positioning a bottom hole assembly within a wellbore, wherein the bottom hole assembly comprises an acoustic logging tool, coiled tubing, and one or more inflatable packers;
detecting acoustic signal data from within the wellbore using the acoustic logging tool;
while running in hole, transmitting and analyzing the acoustic signal data in real time using edge computing;
based on the analyzed acoustic signal data, identifying a leak interval within the wellbore; and
isolating a leak in the leak interval using the bottom hole assembly.

2. The method of claim 1, further comprising: following identification of the leak interval, pumping a fluid through the coiled tubing of the bottom hole assembly to inflate the one or more packers to isolate the leak interval.

3. The method of claim 1, wherein the leak interval is identified based on acoustic waves.

4. The method of claim 1, wherein isolating the leak comprises deploying the one or more inflatable packers in the bottom hole assembly to seal a target zone corresponding to the leak interval.

5. The method of claim 1, further comprising: transmitting data identifying the leak interval to a surface of the wellbore in real time; and analyzing the data identifying the leak interval using artificial intelligence methods.

6. The method of claim 5, wherein the artificial intelligence methods comprise edge computing.

7. The method of claim 1, wherein identifying the leak interval further comprises:
obtaining temperature values from one or more temperature sensors within the wellbore; and
generating a temperature profile for the wellbore.

8. The method of claim 7, wherein the leak interval is identified based on a correlation between the analyzed acoustic signal data and the temperature profile of the wellbore.

9. The method of claim 1, further comprising predicting, following isolation of the leak, an impact on oil production from the wellbore using artificial intelligence methods.

10. A system for identifying leaks in a wellbore, comprising:
a bottom hole assembly comprising an acoustic logging tool, coiled tubing, and one or more inflatable packers; and
a computing device comprising an artificial intelligence analyzer comprising edge computing capabilities,
wherein when the bottom hole assembly is run into the wellbore, the acoustic logging tool is configured to identify a leak interval using acoustic signal data,
wherein data associated with the leak interval is transmitted to the computing device to be analyzed using the edge computing capabilities,
wherein a leak is identified within the leak interval upon analysis of the data, and
wherein, in response to identifying the leak, the one or more inflatable packers are deployed to isolate the leak in the leak interval.

11. The system of claim 10, wherein the acoustic logging tool comprises one or more acoustic sensors configured to generate the acoustic signal data.

12. The system of claim 11 wherein the one or more acoustic sensors is at least one of a thickness-shear mode resonator, a surface acoustic wave sensor, a shear-horizontal acoustic plate mode sensor, a flexural plate wave sensor, and a microphone.

13. The system of claim 10, further comprising one or more temperature sensors within the wellbore configured to obtain temperature values used to generate a temperature profile of the wellbore, wherein the leak interval is identified based on a correlation between the acoustic signal data and the temperature profile of the wellbore.

14. The system of claim 10, wherein the acoustic logging tool is configured to generate an acoustic log of data related to acoustic signal data with respect to well depth.

15. The system of claim 10, wherein the computing device is configured for transmitting data identifying the leak interval to a surface of the wellbore in real time.

16. The system of claim 10, wherein the artificial intelligence analyzer is one of an artificial neural network, a support vector machine, a decision tree, a regression tree, a random forest, and an extreme learning machine.

17. The system of claim 10, wherein the computing device is configured to predict an impact on oil production from the wellbore following isolation of the leak using a machine learning algorithm.

* * * * *